(12) United States Patent
Nozaki

(10) Patent No.: US 6,389,754 B2
(45) Date of Patent: May 21, 2002

(54) GLASS RUN OF AN AUTOMOBILE

(75) Inventor: Masahiro Nozaki, Nishikasugai-gun (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 0 days.

(21) Appl. No.: 09/725,490

(22) Filed: Nov. 30, 2000

(30) Foreign Application Priority Data

Nov. 30, 1999 (JP) .............................. 11-339720
Sep. 27, 2000 (JP) ........................... 2000-293741

(51) Int. Cl.[7] .............................................. E05D 15/16
(52) U.S. Cl. ....................................... 49/441; 49/498.1
(58) Field of Search ................... 49/440, 441, 475.1, 49/498.1, 495.1

(56) References Cited

U.S. PATENT DOCUMENTS 6,119,404 A * 9/2000 Bschorr et al. ............. 49/498.1
6,138,414 A * 10/2000 Ohmori et al. ................ 49/441
6,185,869 B1 * 2/2001 Kawai .......................... 49/441
6,226,926 B1 * 5/2001 Aritake et al. ................. 49/440
6,266,925 B1 * 7/2001 Camerer ..................... 49/475.1
6,273,433 B1 * 8/2001 Yu .............................. 277/629

FOREIGN PATENT DOCUMENTS

JP          5-62312        8/1993

* cited by examiner

Primary Examiner—Curtis Cohen
(74) Attorney, Agent, or Firm—Pillsbury Winthrop LLP

(57) ABSTRACT

A glass run of an automobile comprises a channel portion including a bottom portion and inner and outer side walls. The glass run further comprises inner and outer seal lips projecting into the channel portion from the inner and outer side walls respectively. The seal lips have back sides facing inside of the channel portion. At least the inner seal lip is thickened in its wall thickness at its middle portion in a manner that the back side of the seal lip projects more inwardly into the channel portion at the middle portion than at a root portion of the seal lip, thereby forming a convex at the middle portion on the back side of the seal lip while relatively forming a concave at the root portion on the back side of the seal lip. The glass run further comprises a sponge elasticity-reinforcing member provided between the root portion on the back side of the inner seal lip and the inner side wall.

8 Claims, 8 Drawing Sheets

GLASS RUN OF AN AUTOMOBILE

BACKGROUND OF THE INVENTION

1. Field of the Invention

This invention relates to a glass run of an automobile for sliding and guiding the peripheral edge of a moving window glass of a door, and for sealing between the window glass and the door when the window glass is fully closed.

2. Description of Related Art

A conventional glass run channel (glass run) 80 of an automobile is shown in FIG. 7 for sliding and guiding the peripheral edge of a moving glass (door glass) 10 upwardly and downwardly. Such a glass run is disclosed in the Related Art Section of Japanese Utility Model Application Laid-Open No. 5-62312. The glass run 80 comprises a main body 81 and two seal lips 82, 83. The main body 81 has a generally U-shaped cross section and is set in a holder (door sash) 20. The seal lips 82, 83 project from both opening ends of the main body 81 toward the bottom surface of the main body 81. The seal lips 82, 83 are provided with notches 86 at their roots, respectively, so as to decrease the load of the door glass 10 moving, which bears against the seal lips 82, 83 when the door glass 10 slidably moves. With the thus-provided notch 86, however, each seal lip 82, 83 is liable to be bent on the boundary of notch 86, which deteriorates the sealing and gripping properties of the glass run 80 compared with another conventional glass run (not shown) without any notches. Such defects of the glass run 80 are pointed out in the Specification of the above-mentioned No. 5-62312.

On the other hand, FIG. 8 shows another glass run 30, which is disclosed in the Embodiment Section of the same Specification. The glass run 30 comprises a main body 31 and two seal lips 32, 33. The main body 31 has a generally U-shaped cross section and is set in the holder 20. The seal lips 32, 33 project from both opening ends of the main body 31 toward the bottom surface of the main body 31. At least one of two seal lips, e.g., the seal lip 32 in FIG. 8, is thinned in its wall thickness compared with that of other conventional glass run, and is provided with a sponge rubber layer 34 attached to the back side thereof.

According to the Specification of the above-mentioned No. 5-62312, the glass run 30 with the thinner lip 32 and the sponge rubber layer 34 shows an increased flexibility and decreased load of the slidably moving door glass 10, which facilitates the vertical movement of the door glass 10. Furthermore, the seal lip 32 bends over its full length and is not bent at its root, so the sealing and gripping properties are secured for the glass run 30 as well as a conventional glass run, so the door glass 10 never rattles, the Specification describes.

However, when the seal lip 32 is thinned in its wall thickness and the sponge rubber layer 34 is attached to the back side of the seal lip 32, so that when the seal lip 32 bends over its full length and is not bent at its root, as is the case with the glass run 30 shown in FIG. 8, the following problem occurs. Namely, when the door glass 10 vertically moves, and the contact position on the door glass, where the door glass 10 slidably contacts the seal lip 32, varies in the direction of the inside and outside of an automobile, as shown in FIG. 9, the radius of curvature on the outer surface of the seal lip 32 easily varies over its full length. Therefore, the contact width W of the seal lip 32 and the door glass 10 varies to vary their contact area, which causes the adverse effect for slidable movement of the door glass 10. By the way, it is also disclosed in the same Specification that the sponge rubber layer 34 is divided at a position near its root to form a branch. The tip of the branch is connected to the middle portion on the inner surface of a side wall of the main body to form a hollow portion. Even if the hollow portion is formed, there is no change in that the above-mentioned problem remains.

SUMMARY OF THE INVENTION

It is an object of this invention to provide a glass run of an automobile which can achieve the following effects (1) to (4).

(1) A seal lip is thickened in its wall thickness at its middle portion in a manner that the back side of the seal lip projects more to the other side at the middle portion than at its root portion, thereby forming a convex at the middle portion on the back side of the seal lip. Accordingly, when a door glass moves, and a contact position on the door glass, where the door glass slidably contacts the seal lip, varies, the radius of curvature on the outer surface of the seal lip hardly varies over its full length except for the root portion of the seal lip. Therefore, the contact width of the seal lip and the door glass, consequently, their contact area, hardly varies, which never causes adverse effect for slidable movement of the door glass.

(2) when the door glass moves, and the contact position on the door glass, where the door glass slidably contacts a seal lip, varies, the seal lip easily bends by its root because of the concave formed in the root portion on the back side of the seal lip. Moreover, the elasticity of the seal lip is reinforced by a sponge elasticity-reinforcing member. As a result, the door glass is prevented from rattling without increasing the force in controlling the movement of the door glass.

(3) When a door is strongly closed with the door glass being slightly opened, the door glass swings widely. Even if the door glass swings widely, the seal lip is prevented from contacting a side wall of a channel portion by the sponge elasticity-reinforcing member intervening therebetween, which prevents generation of a contacting sound.

(4) With the sponge elasticity-reinforcing-member, occurrence of permanent set in fatigue or abnormal deformation of the seal lip is prevented, and the follow-up quality of the seal lip to the door glass and the sealing quality of the seal lip are not deteriorated.

A first invention resides in a glass run comprising a channel portion including a bottom portion and inner and outer side walls. The inner side wall is provided inside of an automobile, while the outer side wall is provided outside of the automobile. The glass run further comprises inner and outer seal lips projecting into the channel portion from the inner and outer side walls respectively. The inner seal lip is provided inside of the automobile, while the outer seal lip is provided outside of the automobile. The seal lips have back sides facing inside of the channel portion. At least the inner seal lip is thickened in its wall thickness at its middle portion in a manner that the back side of the seal lip projects more inwardly into the channel portion at the middle portion than at a root portion of the seal lip, thereby forming a convex at the middle portion on the back side of the seal lip while relatively forming a concave at the root portion on the back side of the seal lip. The glass run further comprises a sponge elasticity-reinforcing member provided between the root portion on the back side of the inner seal lip and the inner side wall.

The sponge elasticity-reinforcing member may extend to the middle portion of the seal lip. In such a case, it is preferable that the wall thickness of sponge on the middle portion is thinner than that formed between the root portion and the inner side wall.

A second invention resides in a glass run comprising a channel portion including a bottom portion and inner and outer side walls. The inner side wall is provided inside of an automobile, while the outer side wall is provided outside of the automobile. The glass run further comprises inner and outer seal lips projecting into the channel portion from the inner and outer side walls respectively. The inner seal lip is provided inside of the automobile, while the outer seal lip is provided outside of the automobile. The seal lips have back sides facing inside of the channel portion. At least the inner seal lip is thickened in its wall thickness at its middle portion in a manner that the back side of the seal lip projects more inwardly into the channel portion at the middle portion than at a root portion of the seal lip, thereby forming a convex at the middle portion on the back side of the seal lip while relatively forming a concave at the root portion on the back side of the seal lip. The glass run further comprises a sponge elasticity-reinforcing member formed like a bridge for connecting the middle portion on the back side of the inner seal lip and the inner side wall.

In the first or second invention, the channel portion is preferably formed by extrusion molding from a solid rubber or a solid thermoplastic elastomer (hereinafter referred to as TPE) having a spring hardness of Hs 70° to 90° in accordance with JIS A. When priority is given to the permanent set resistant property of the seal lips of the glass run, the seal lips are formed from a solid ethylene-propylene-diene terpolymer (EPDM) rubber. In this case, it is preferable that the channel portion is formed from the same solid rubber as the seal lips. A solid EPDM rubber having a spring hardness of Hs 70° to 80° in accordance with JIS A is more preferable.

The seal lips are preferably formed from a solid rubber or a solid TPE having a spring hardness of Hs 50° to 90° in accordance with JIS A and being different from a solid rubber or a solid TPE which forms the channel portion in compounding ratio of materials. A solid EPDM rubber having a spring hardness of about Hs 70° is preferable from a viewpoint of permanent set in fatigue resistant property. The seal lips are preferably formed from the same kind of material as is used for the channel portion from a viewpoint of successive integral forming.

The sponge elasticity-reinforcing member is preferably formed from a sponge rubber or a sponge TPE. A TPE foam (sponge), especially an olefin-based TPE (TPO) foam, or a sponge EPDM rubber is preferable. When the seal lips are formed from a solid EPDM rubber and the sponge elasticity-reinforcing member is formed from a sponge EPDM rubber, the bonding connection between connecting surfaces of these two components are strengthened. Because both are the same kind of materials and the SP (Solubility Parameter) of these components are the same or closer to each other.

When the seal lips and channel portion are formed from a solid TPO, a material for the sponge elasticity-reinforcing member is preferably decided as follows. Namely, if the object of the material selection for the seal lips and channel portion is to eliminate the vulcanization process and simplify the manufacturing process to thereby decrease the manufacturing cost, the sponge elasticity-reinforcing member is preferably formed from a sponge TPO. On the other hand, if the object is to make up for the decrease in the flexibility of the seal lips, the sponge elasticity-reinforcing member is preferably formed from a sponge EPDM rubber. In this case, the sponge elasticity-reinforcing member can be formed by simultaneous extrusion molding by inserting a previously prepared linear sponge EPDM rubber.

It is preferable that the surface of the bottom portion is covered with a low-friction layer. The low-friction layer can be formed by conventional techniques such as applying a urethane coating or bonding a polyethylene sheet. The low-friction layer on the bottom portion is preferably formed from a TPE or a resin having a Shore D type hardness of 45° to 60°. It is more preferable that the low-friction layer is formed from a TPO having a Shore D type hardness of about 55°. The low-friction layer is preferably formed by simultaneous extrusion molding from a TPO.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

Figure 6:
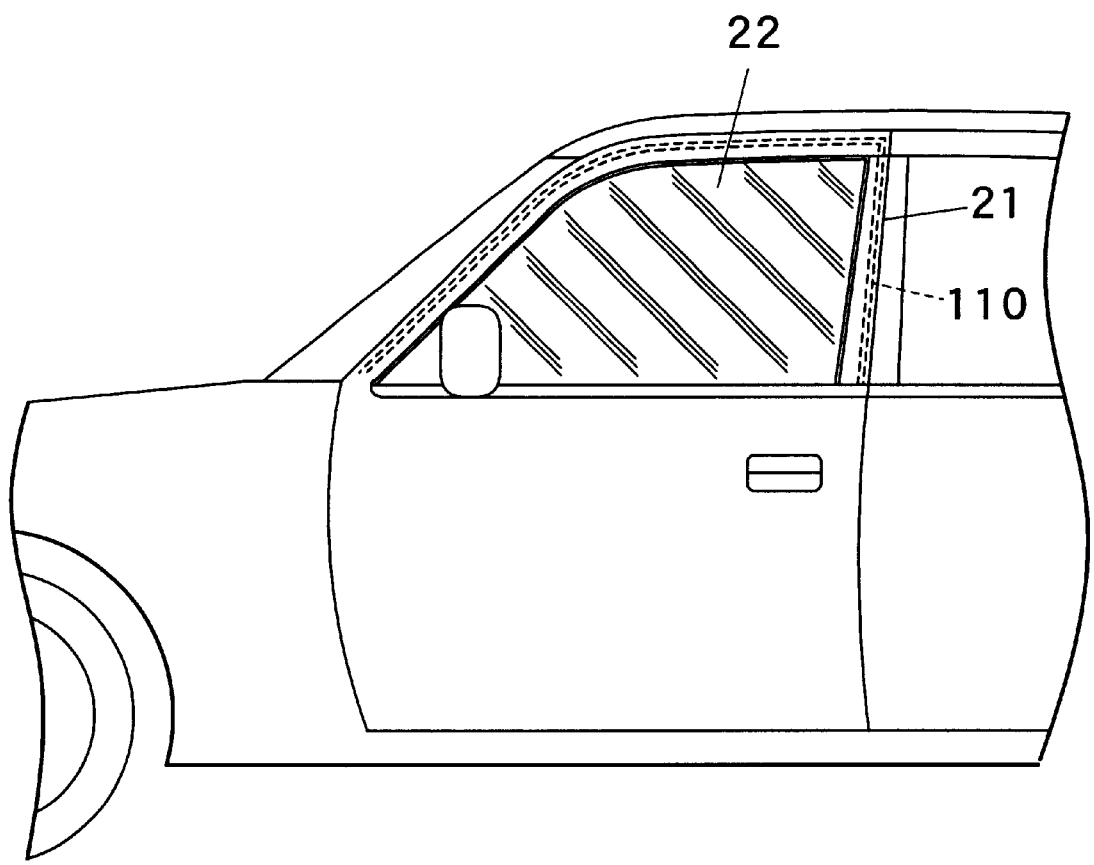
FIG. 6 is a partial side view of an automobile to which the glass run of each embodiment is applied.
Figure 7:
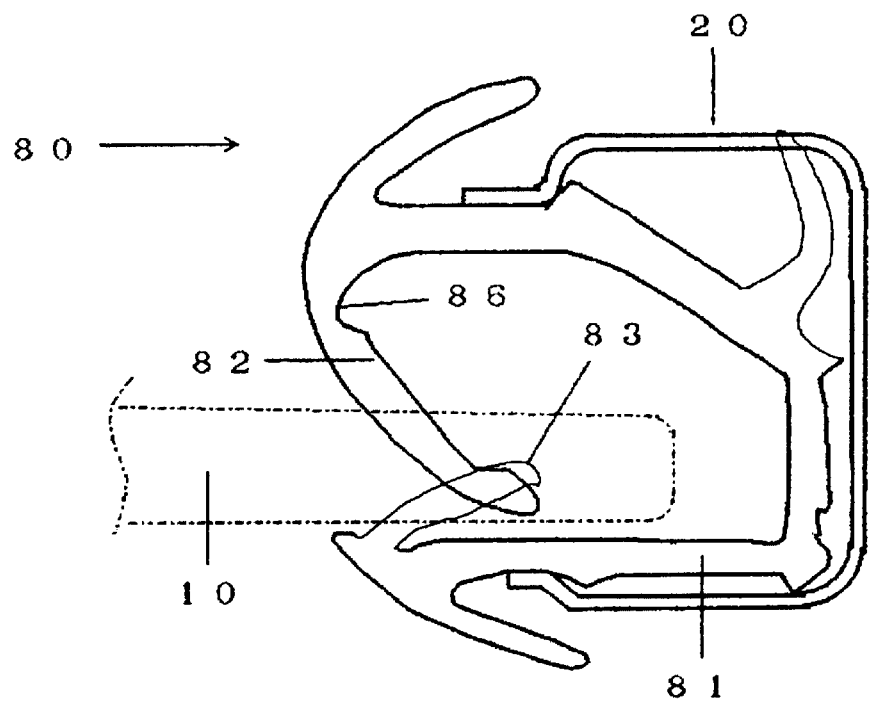
FIG. 7 is a sectional view showing a conventional glass run.
Figure 8:
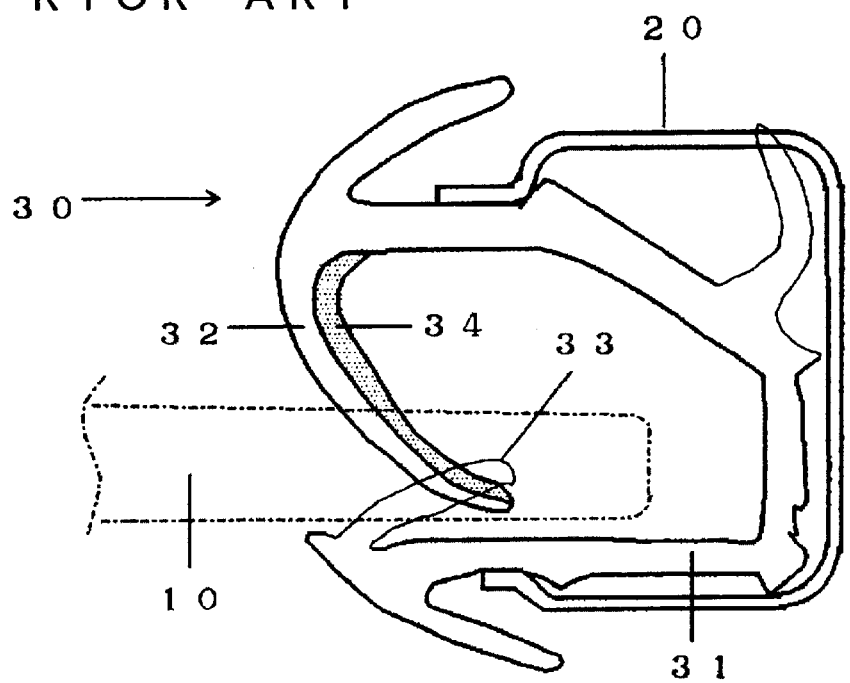
FIG. 8 is a sectional view showing another conventional glass run.
Figure 9:
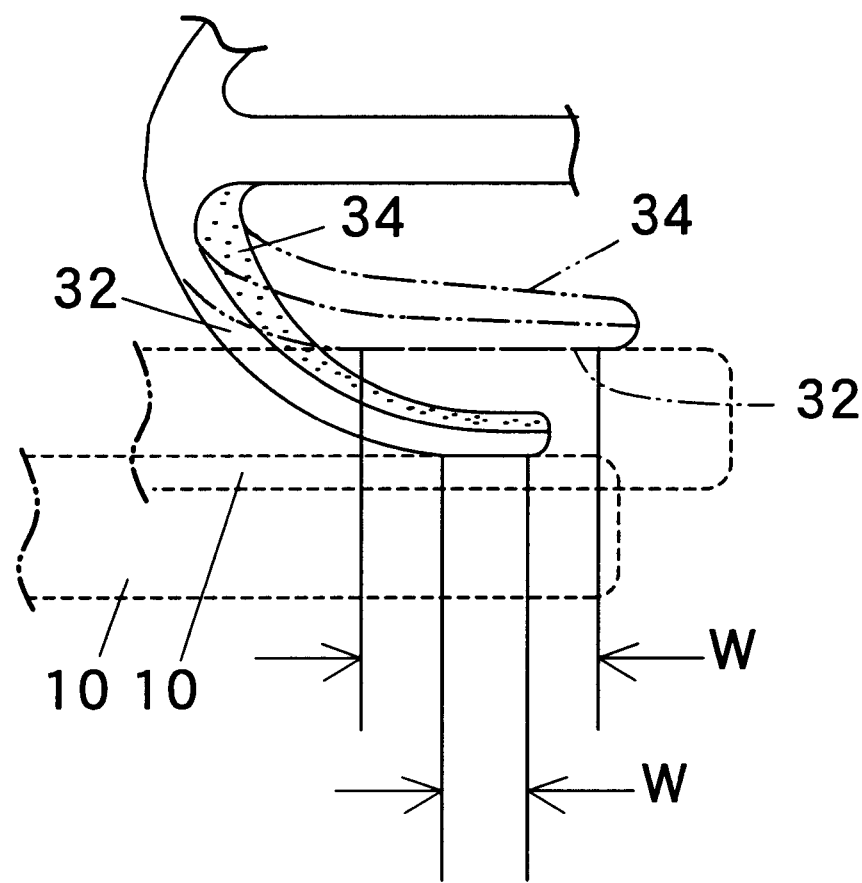
FIG. 9 is a sectional view showing the operation of the glass run of FIG. 8.

Each embodiment shows a glass run, which is attached to a door sash 21, as shown in FIG. 6, and seals between the outer peripheral edge of a vertically moving door glass 22 and the door sash 21.

Figure 1:
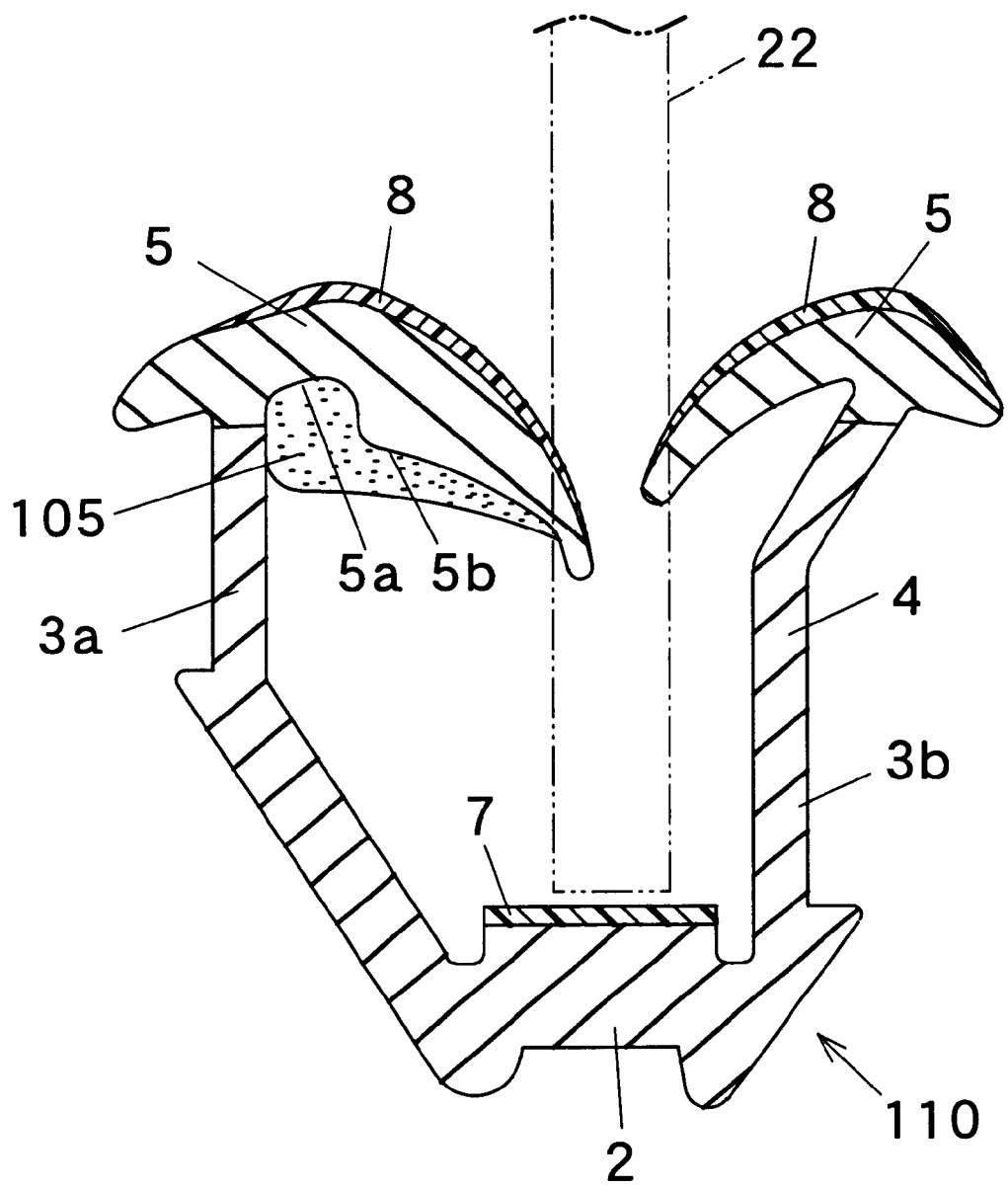
FIG. 1 is a sectional view showing a glass run of the first embodiment of the present invention.

A glass run 110 of a first embodiment is shown in FIG. 1. This glass run 110 comprises a channel portion 4, which includes a bottom portion 2 and two side walls 3a, 3b. The inner side wall 3a is provided on the inner side of the door glass 22 in a door of an automobile, while the outer side wall 3b is provided on the outer side of the door glass 22. The glass run 110 further comprises two seal lips 5 which project into the interior space of the channel portion 4 from the free ends of both side walls 3a, 3b respectively. The channel portion 4 is formed from a solid EPDM rubber having a spring hardness of Hs 70° to 90°, while the seal lips 5 are formed from a solid EPDM rubber, having a spring hardness of Hs 50° to 70°, which is different from EPDM for the channel portion 4 in the compounding ratio of materials. "Spring hardness" is a value measured in accordance with JIS A. The glass run 110 further comprises a sponge elasticity-reinforcing member 105 provided between the root portion on the back side of the inner seal lip 5, which is provided on the inner side of the door glass 22, and the inner side wall 3a of the channel portion 4. The sponge elasticity-reinforcing member 105 is formed from a sponge EPDM rubber. The channel portion 4, seal lips 5 and sponge elasticity-reinforcing member 105 are integrally formed by extrusion molding. The sponge elasticity-reinforcing member 105 may be provided between the outer seal lip 5 provided on the outer side of the door glass 22, and the outer side wall 3b. A low-friction layer 7 is formed on the inner surface of the bottom portion 2 of the channel portion 4, while low-friction layers 8 are formed on the outer surfaces of the seal lips 5. The low-friction layers 7, 8 are low-friction films having a thickness of about 50 μm, which are formed from a polyurethane resin having a spring hardness of about Hs 90° (JIS A).

It is possible to form the channel portion 4 from a solid TPO having a spring hardness of Hs 70° to 90° (JIS A), and form the seal lips 5 from a solid TPO having a spring hardness of Hs 50° to 70° (JIS A). In such a case, it is possible to form the low-friction layer 7 on the bottom portion 2 from a TPO having a Shore D type hardness of 45° to 60°, and form the low-friction layers 8 on the seal lips 5 from a TPO, having a Shore D type hardness of 30° to 45°, which is different from TPO for the low-friction layer 7 in the compounding ratio of materials. Furthermore, the sponge elasticity-reinforcing member 105 may be formed by simultaneous extrusion molding from a TPO foam (sponge).

Figure 2:
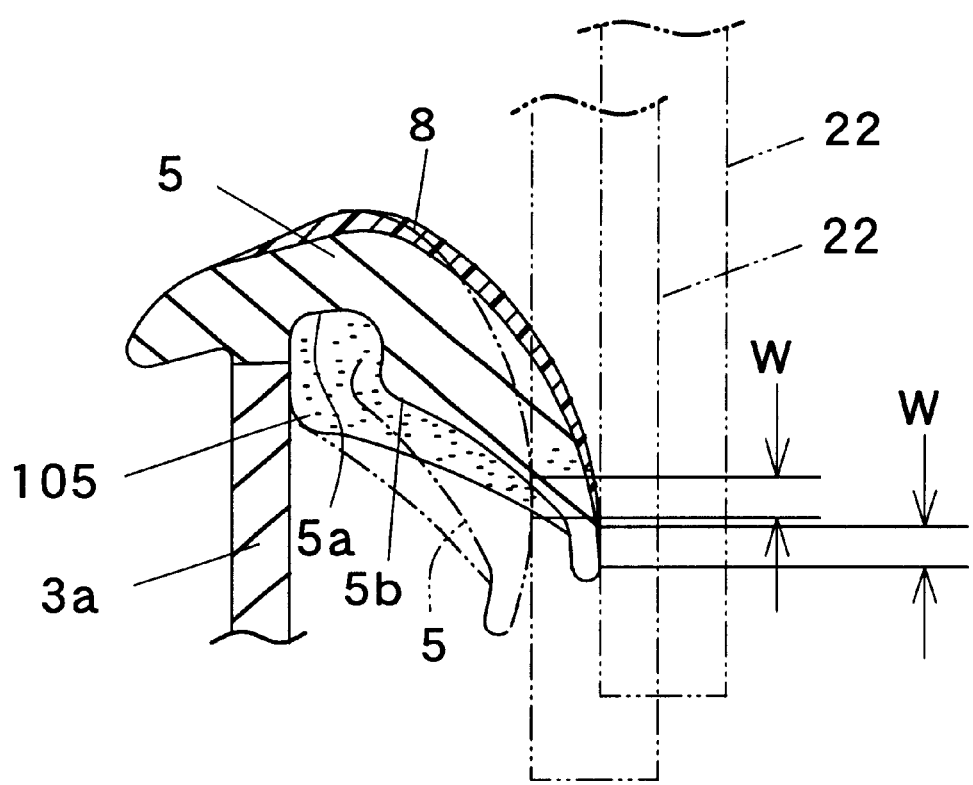
FIG. 2 is a partial sectional view showing the operation of the glass run of FIG. 1.

According to the glass run 110 of this first embodiment, the inner seal lip 5 is thickened in its wall thickness at its middle portion in a manner that the back side of the seal lip 5 projects more inwardly into the channel portion 4 at the middle portion than at a root portion of the seal lip 5, thereby forming a convex 5b at the middle portion while relatively forming a concave 5a at the root portion. With this structure, the boundary between the sponge elasticity-reinforcing member 105 and the inner seal lip 5 is formed to the ruggedness. As a result, the contact area between the member 105 and the seal lip 5 increases, which strengthens the bonding connection therebetween. Moreover, the middle portion of the seal lip 5 is thickened in its wall thickness and it shows a high rigidity. Accordingly, when the door glass 22 vertically moves, and the contact position on the door glass 22, where the door glass 22 slidably contacts the seal lip 5, varies in the inside and outside direction of the automobile, as is shown in FIG. 2, the radius of curvature on the outer surface of the seal lip 5 hardly varies over its full length except for the root portion of the seal lip 5. Therefore, the contact width W of the seal lip 5 and the door glass 22, consequently, their contact area, hardly varies, which never causes adverse effect for slidable movement of the door glass 22.

The seal lip 5 easily bends by its root because of the concave 5a formed in the root portion on the back side thereof. Moreover, the elasticity of the seal lip 5 is reinforced by the sponge elasticity-reinforcing member 105 which fills the concave 5a. As a result, the door glass 22 is prevented from rattling without increasing the force in controlling the vertical movement of the door glass 22. Furthermore, when the door is strongly closed with the door glass 22 being slightly opened, the door glass 22 swings widely. Even if the door glass 22 swings widely, the inner seal lip 5 is prevented from contacting the inner side wall 3a of the channel portion 4 by the sponge elasticity-reinforcing member 105 intervening therebetween, which prevents generation of a contacting sound. Moreover, with the sponge elasticity-reinforcing member 105, occurrence of permanent set in fatigue or abnormal deformation of the seal lip 5 is prevented, and the follow-up quality of the seal lip 5 to the door glass 22 and the sealing quality of the seal lip 5 are not deteriorated.

Figure 3:
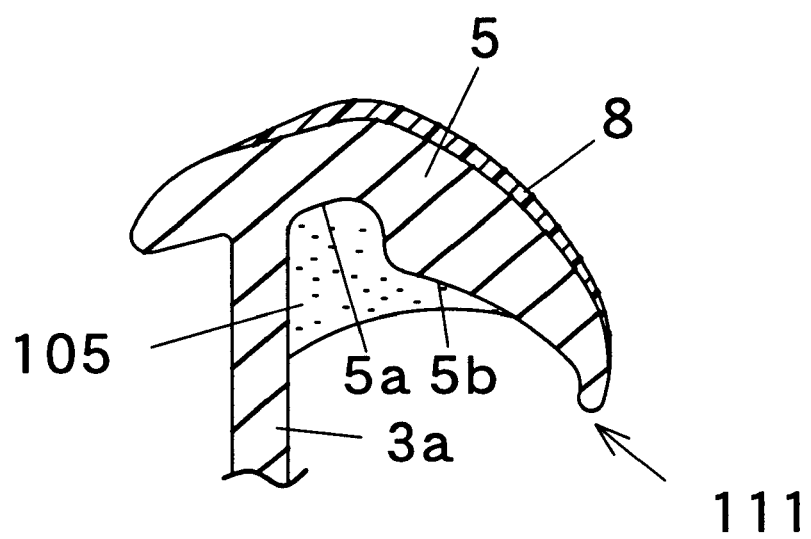
FIG. 3 is a partial sectional view showing a modified glass run of FIG. 1.

FIG. 3 shows a modified glass run 111 of the first embodiment. The glass run 111 comprises a sponge elasticity-reinforcing member 105 provided only on the root portion of a seal lip 5. The sponge elasticity-reinforcing member 105 is formed from a sponge EPDM rubber to have an increased wall thickness. The entire wall thickness of the modified seal lip 5 shown in FIG. 3 is formed thinner than that shown in FIG. 1. So the seal lip 5 can be formed from the same material as is used for the channel portion 4, i.e., a solid EPDM rubber or a solid TPO, having a spring hardness of Hs 70° to 90° (JIS A). Other components of the glass run 111 are the same as those of the glass run 110 of FIG. 1. Accordingly, the same effect as is achieved by the glass run 110 of FIG. 1 is also achieved by the glass run 111. Moreover, the same material can be used for the channel portion 4 and the seal lips 5, so that the glass run 111 can be manufactured easier than the glass run 110 of FIG. 1.

Figure 4:
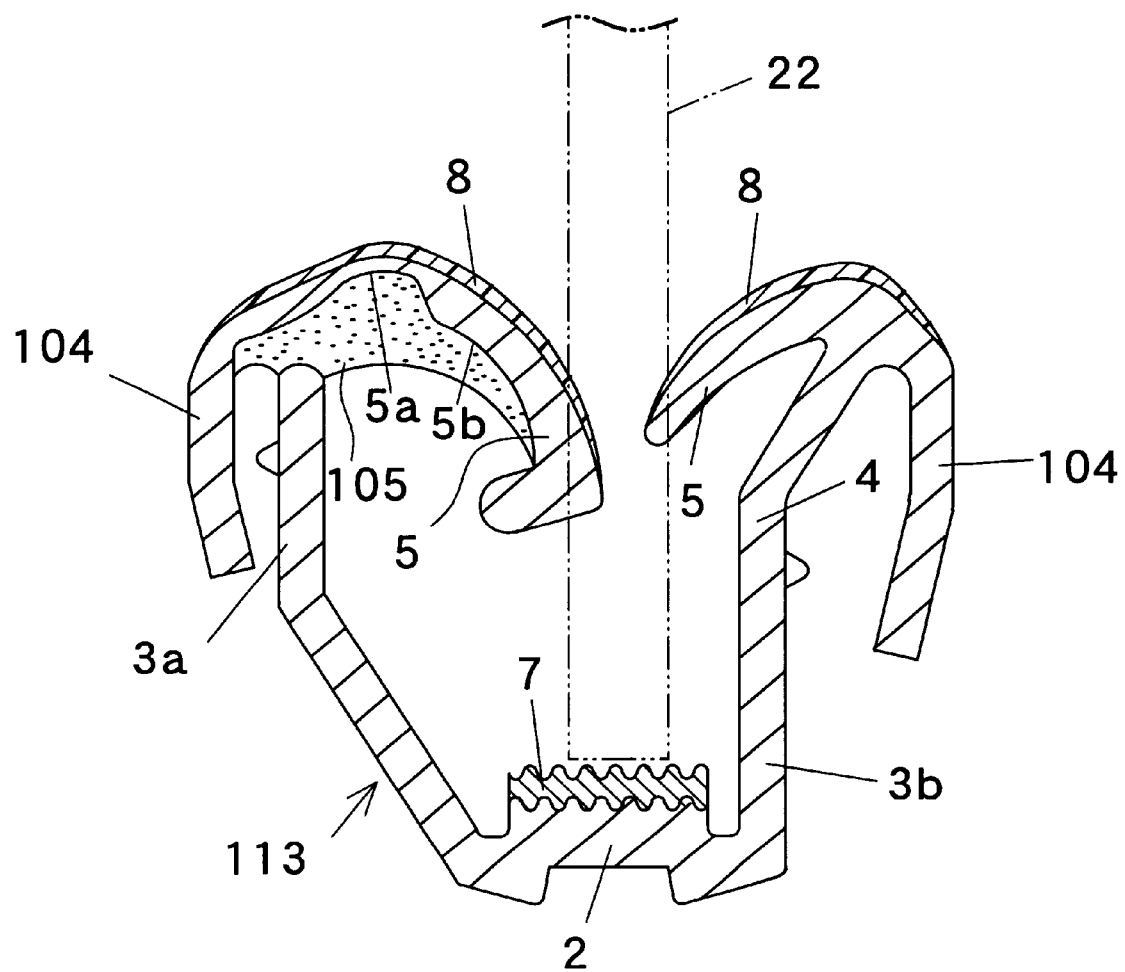
FIG. 4 is a sectional view showing a glass run of the second embodiment.

A glass run 113 of a second embodiment is shown in FIG. 4. This glass run 113 comprises covering lips 104 provided on the outer sides of the side walls 3a, 3b of the channel portion 4, respectively. The glass run 113 also comprises the sponge elasticity-reinforcing member 105, which is formed from a sponge EPDM rubber and explained in the first embodiment. According to the glass run 113, however, the inner seal lip 5 and the free end of the inner side wall 3a are connected through the sponge elasticity-reinforcing member 105, and not directly connected by solid EPDM rubber. Furthermore, the boundary between the low-friction layer 7 and the bottom portion 2 of the channel portion 4 is formed to the wavy shape, while a plurality of gutters are formed on the inner surface of the low-friction layer 7 to thereby enhance its slidability against the end face of the door glass 22. Other components of the glass run 113 are the same as those of the first embodiment. Accordingly, the same effect as is achieved by the glass run 110 is also achieved by the glass run 113.

Figure 5:
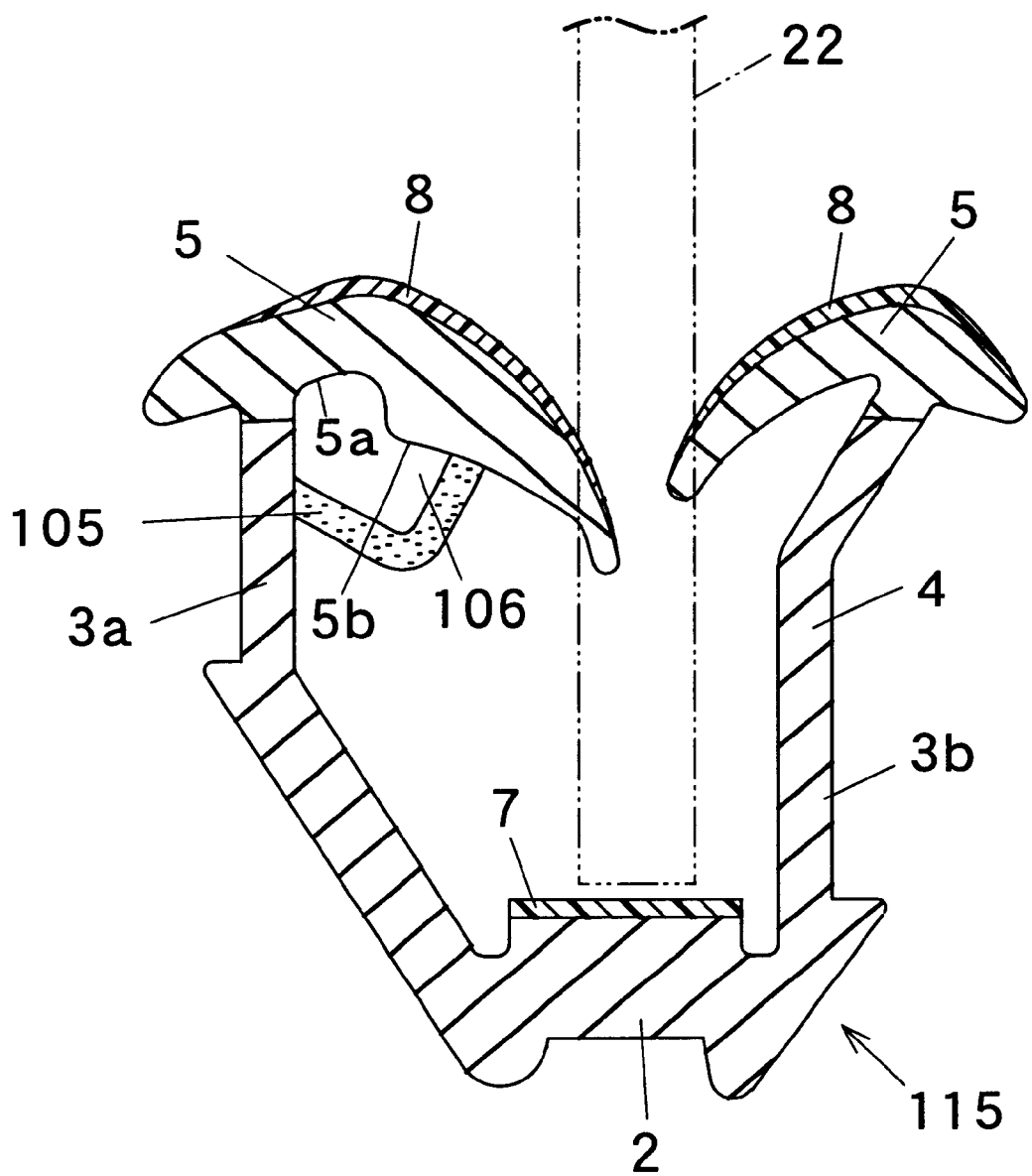
FIG. 5 is sectional view showing a glass run of the third embodiment.

A glass run 115 of a third embodiment is shown in FIG. 5. The glass run 115 comprises a sponge elasticity-reinforcing member 105. The sponge elasticity-reinforcing member 105 is formed like a bridge for connecting the middle portion on the back side of the inner seal lip 5 and the middle portion of the inner side wall 3a, and forms a hollow portion 106 between itself and the root portion on the back side of the inner seal lip 5. Other components of the glass run 115 are the same as those of the first embodiment. Accordingly, the same effect as is achieved by the glass run 110 is also achieved by the glass run 115 with such a bridge-like sponge elasticity-reinforcing member 105.

The present invention is not restricted to the embodiments described above, but it can be changed and embodied properly within such a range as not departing from the gist of the invention, for example, as shown below.

(1) The present invention may be applied to a glass run used for a side or rear sliding glass of an automobile.

(2) The present invention may be applied to a glass run (weather strip) used for a slide part of a sliding roof provided on the roof part of an automobile.

As many apparently widely different embodiments of this invention may be made without departing from the spirit and scope thereof, it is to be understood that the invention is not limited to the specific embodiments thereof except as defined in the appended claims.

What is claimed is:

1. A glass run of an automobile comprising:
   a channel portion including a bottom portion and inner and outer side walls, said inner side wall being provided inside of the automobile, and said outer side wall being provided outside of said automobile;

inner and outer seal lips projecting into said channel portion from said inner and outer side walls respectively, said inner seal lip being provided inside of said automobile, said outer seal lip being provided outside of said automobile, said seal lips having back sides facing inside of said channel portion, and at least said inner seal lip being thicker in its wall thickness at its middle portion in a manner that said back side of said seal lip projects more inwardly into said channel portion at said middle portion than at a root portion of said seal lip, thereby forming a convex at said middle portion on said back side of said seal lip while relatively forming a concave at said root portion on said back side of said seal lip; and a sponge elasticity-reinforcing member provided between said concave at said root portion on said back side of said inner seal lip and said inner side wall, whereby at least said inner seal lip has an outer surface which forms a curved convex having a predetermined radius of curvature, and wherein said radius of curvature on said outer surface of the inner seal lip hardly varies when the inner seal lip bends by its root portion.

2. A glass run according to claim 1, wherein said channel portion is formed by extrusion molding from a solid rubber or a solid thermoplastic elastomer having a spring hardness of Hs 70° to 90° in accordance with JIS A.

3. A glass run according to claim 1, wherein said seal lips are formed from a solid rubber or a solid thermoplastic elastomer having a spring hardness of Hs 50° to 90° in accordance with JIS A and being different from a solid rubber or a solid thermoplastic elastomer which forms said channel portion in compounding ratio or materials.

4. A glass run according to claim 1, wherein said sponge elasticity-reinforcing member is formed from a sponge rubber or a sponge thermoplastic elastomer.

5. A glass run of an automobile comprising:

a channel portion including a bottom portion and inner and outer side walls, said inner side wall being provided inside of an automobile, and said outer side wall being provided outside of the automobile;

inner and outer seal lips projecting into said channel portion from said inner and outer side walls respectively, said inner seal lip being provided inside of said automobile, said outer seal lip being provided outside of said automobile, and seal lips having back sides facing inside of said channel portion, and at least said inner seal lip being thicker in its wall thickness at its middle portion in a manner that said back side of said seal lip projects more inwardly into said channel portion at said middle portion than at a root portion of said seal lip, thereby forming a convex at said middle portion on said back side of said seal lip while relatively forming a concave at said root portion on said back side of said seal lip; and a sponge elasticity-reinforcing member formed like a bridge for connecting said middle portion on said back side of said inner seal lip and said inner side walls, wherein at least said inner seal lip has an outer surface which forms a curved convex having a predetermined radius of curvature, and wherein said radius of curvature on said outer surface of the inner seal lip hardly varies when the inner seal lip bends by its root portion.

6. A glass run according to claim 5, wherein said channel portion is formed by extrusion molding from a solid rubber or a solid thermoplastic elastomer having a spring hardness of Hs 70° to 90° in accordance with JIS A.

7. A glass run according to claim 5, wherein said seal lips are formed from a solid rubber or a solid thermoplastic elastomer having a spring hardness of Hs 50° to 90° in accordance with JIS A and being different from a solid rubber or a solid thermoplastic elastomer which forms said channel portion in compounding ratio of materials.

8. A glass run according to claim 5, wherein said sponge elasticity-reinforcing member is formed from a sponge rubber or a sponge thermoplastic elastomer.

* * * * *